United States Patent
Tailliet

(10) Patent No.: US 9,003,265 B2
(45) Date of Patent: Apr. 7, 2015

(54) METHOD FOR PROCESSING A NON-VOLATILE MEMORY, IN PARTICULAR A MEMORY OF THE EEPROM TYPE, FOR THE STORAGE THEN THE EXTRACTION OF INFORMATION, AND CORRESPONDING MEMORY DEVICE

(71) Applicant: STMicroelectronics (Rousset) SAS, Rousset (FR)

(72) Inventor: Francois Tailliet, Fuveau (FR)

(73) Assignee: STMicroelectronics (Rousset) SAS, Rousset (FR)

(*) Notice: Subject to any disclaimer, the term of this patent is extended or adjusted under 35 U.S.C. 154(b) by 87 days.

(21) Appl. No.: 13/897,940

(22) Filed: May 20, 2013

(65) Prior Publication Data

US 2013/0311855 A1   Nov. 21, 2013

(30) Foreign Application Priority Data

May 21, 2012   (FR) ...................................... 12 54582

(51) Int. Cl.
   *G06F 11/10*   (2006.01)
(52) U.S. Cl.
   CPC ........ *G06F 11/1068* (2013.01); *G06F 11/1052* (2013.01)
(58) Field of Classification Search
   CPC ..................... G06F 11/1052; G06F 11/1068
   USPC ........................................ 714/773, 752, 797
   See application file for complete search history.

(56) References Cited

U.S. PATENT DOCUMENTS

| | | | |
|---|---|---|---|
| 6,523,114 B1* | 2/2003 | Barton ........................... | 713/176 |
| 6,988,237 B1 | 1/2006 | Solt et al. | |
| 7,280,701 B2* | 10/2007 | Moroo et al. ................. | 382/239 |
| 7,814,396 B2 | 10/2010 | Janke et al. | |
| 8,418,006 B1* | 4/2013 | Trimberger ................... | 714/725 |
| 2002/0118859 A1* | 8/2002 | Stone et al. ................... | 382/100 |
| 2003/0182611 A1* | 9/2003 | Wu ............................... | 714/752 |

* cited by examiner

*Primary Examiner* — John P Trimmings
(74) *Attorney, Agent, or Firm* — Slater & Matsil, L.L.P.

(57) ABSTRACT

Method for processing a non-volatile memory designed to store words containing data bits and control bits allowing an error correction with an error correction code, the method comprising the storage of information in the memory plane comprising an operation for writing in the memory plane at least one digital word modified with respect to at least one initial digital word not having any erroneous bit, said at least one modified digital word containing a bit having a modified value with respect to the value of this bit in said at least one initial digital word, the other bits of the modified digital word having values identical to those of these same bits in the initial digital word, the position of the modified bit in said at least one modified digital word defining the value of the digital information.

32 Claims, 6 Drawing Sheets

METHOD FOR PROCESSING A NON-VOLATILE MEMORY, IN PARTICULAR A MEMORY OF THE EEPROM TYPE, FOR THE STORAGE THEN THE EXTRACTION OF INFORMATION, AND CORRESPONDING MEMORY DEVICE

BACKGROUND

This application claims priority to French Patent Application No. 1254582, which was filed May 21, 2012 and is incorporated herein by reference.

BRIEF DESCRIPTION OF DRAWINGS

Other advantages and features of the invention will become apparent upon examining the detailed description of non-limiting embodiments and the appended drawings in which.

DETAILED DESCRIPTION OF EMBODIMENTS

Figure 1:
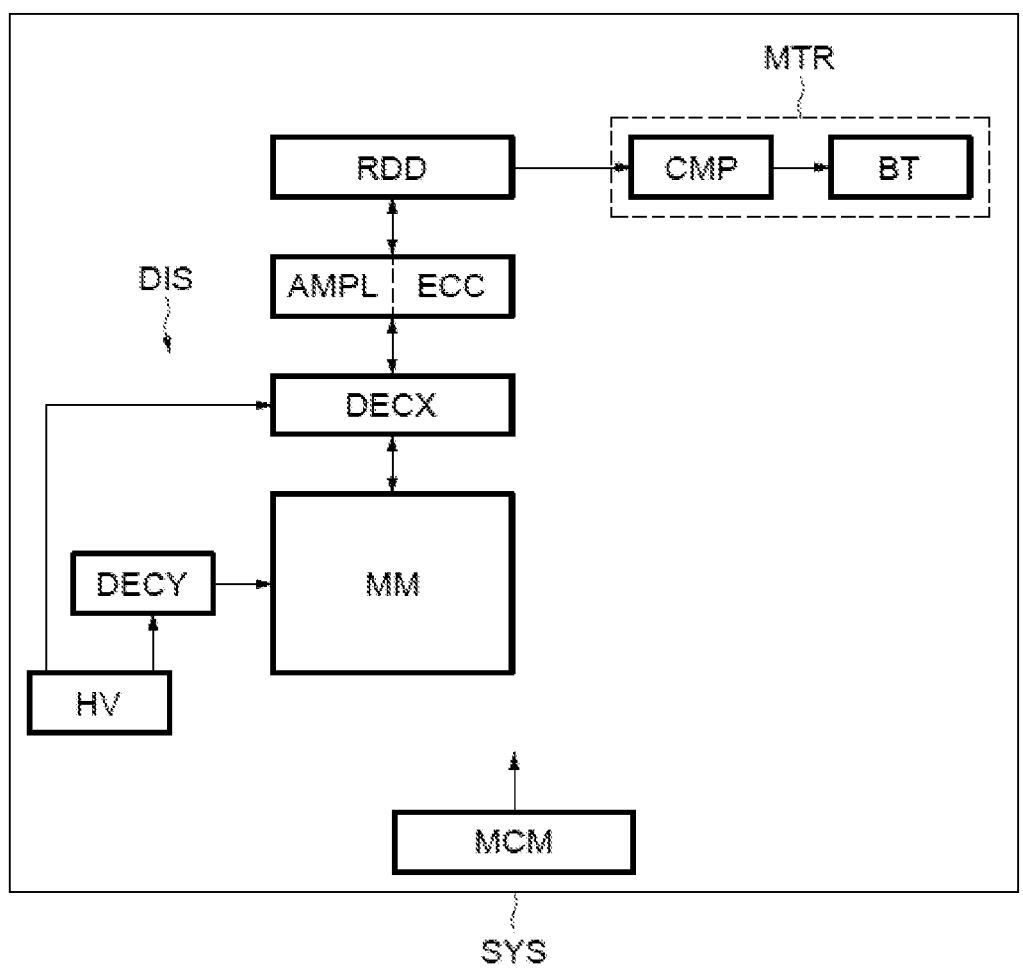
FIGS. 1 to 10, essentially schematic, relate to various embodiments of the invention.

Before addressing the illustrated embodiments in details, various aspects and advantageous features will be described generally in the following paragraphs The invention relates to memories, notably non-volatile memories, such as for example ROM memories of the electrically programmable and erasable type (memories of the EEPROM type) and, more particularly, the storage of information buried in the content of the memory plane, together with its extraction.

The applications of the invention are manifold, such as for example the storage of a unique identifier, or else of a cryptographic authentication key. Other applications that may be mentioned, without this being limiting, are anti-cloning or monitoring of the non-replacement of parts, for example of motor vehicle parts, such as for example odometers.

According to one embodiment, the idea is to store a piece of information in the memory without altering the initial content of this memory obtained during a conventional read operation of the memory while at the same time rendering this information inaccessible during this conventional read operation of the memory.

According to another embodiment, an ephemeral storage of this information is provided.

According to another embodiment, the idea is to store the information in the memory in a totally "free" manner, in other words not only without requiring any additional memory location, but also without requiring any additional circuitry dedicated to the extraction of this information.

Non-volatile memories, notably of EEPROM type, are subject to corruptions of data due to defective memory locations or memory cells commonly denoted by those skilled in the art under the term "single bit fails".

These defects may be initially present in "brand new" memories or else be initially absent but generated over time during the life of the part.

These defects may be due for example to defects arising in the fabrication process, to breakdown of oxides and to occurrences of retention losses on isolated memory cells.

These defective memory locations lead, when the bits contained in these locations are read, to erroneous logical values.

One conventional solution consists in using an error correction code or ECC for correcting the erroneous logical value of a bit. More precisely, with an error correction code, ifs control bits are added to b data bits, r errors can be corrected amongst the b+s bits.

Generally speaking, the error correction codes used in the field of memories allow a single error (r=1) to be corrected in the word of b+s bits. Two errors in a memory may be corrected as long as the two defective locations correspond to two bits not situated in the same group of (b+s) bits.

According to one embodiment, the error correction code associated with the memory is used and a voluntary injection of an error into the words stored in the memory is carried out. The position in a word of the injected error allows information, that is recordable and readable, to be defined. Furthermore, during a normal use of the memory, the read error is localized and corrected by the error correction code, hence masked. Then, during a write operation (during a reprogramming operation), the error is deleted and the information initially stored is lost.

According to one aspect, a method is provided for processing a non-volatile memory designed to store words containing data bits and control bits allowing an error correction with an error correction code; this non-volatile memory is for example of the electrically programmable and erasable (EEPROM) type.

The method comprises the storage of information in the memory plane, this storage comprises an operation for writing in the memory plane at least one digital word modified with respect to at least one initial digital word not having any erroneous bit, said at least one modified digital word containing a bit having a modified value with respect to the value of this bit in said at least one initial digital word, the other bits of the modified digital word having identical values to those of these same bits in the initial digital word, the position of the modified bit in said at least one modified digital word defining the value of the digital information.

The modified bit may be situated in all the bits of the word, including the control bits. However, it is particularly simple to arrange that the bit of the modified word which has its value modified is a data bit, and that the control bits of the modified digital word have values determined based on the values of the data bits of said at least one initial digital word.

Indeed, as will be seen in more detail hereinafter, this allows the information to be extracted in a particularly simple manner by disabling the means forming an error correction code. In addition, this also allows the information to be stored in the memory in a totally "free" manner, in other words not only without needing an additional memory location, but also without the need for additional circuitry dedicated to the extraction of this information.

According to one embodiment, in practice, the storage of said information in the memory plane comprises an operation for writing in the memory plane several digital words respectively modified with respect to several initial digital words not having any erroneous bit, each modified digital word containing a bit having a modified value with respect to the value of this bit in the said corresponding initial digital word, the other bits of the modified digital word having values identical to those of these same bits in the corresponding initial digital word, the respective positions of the modified bits in the modified digital words defining together the value of the digital information.

According to one embodiment, the method furthermore comprises an extraction processing carried out on each modified digital word, delivering the position of the modified bit in each modified digital word.

A first possibility for carrying out this extraction, whether the modified bit is situated in the field of the data bits or else in the field of the control bits, consists in disabling the error correction code, and in carrying out an operation for reading the word with the error correction code disabled.

In a particularly simple case where each initial word only contains "1"s (field FF), the extraction processing comprises, after disabling the error correction code, the determination of the position of the "0" in each modified digital word.

However, the initial digital words may have any given contents.

Accordingly, according to one possible embodiment, the extraction processing comprises the disabling of the error correction code, the reading of each modified digital word, and the determination of said value of the digital information comprising a comparison of the bits of each modified digital word with the bits of the corresponding initial word, the result of each comparison supplying the position of the modified bit in the corresponding digital word.

Furthermore, the bits of the corresponding initial word may be advantageously obtained by reading the modified digital word with the error correction code active.

As a variant, the extraction of the position of the error can be carried out by the memory itself, and more particularly, by the error correction code, the position of the modified bit in each modified digital word then being detected and stored in the volatile registers of the means forming an error correction.

According to one embodiment, the method furthermore comprises a reprogramming of the memory plane with at least one new digital word replacing at least one modified digital word. Thus, any subsequent programming of the memory erases the information since the error correction is active.

It is perfectly possible for some of the modified digital words to comprise, aside from the voluntarily modified bit, another error resulting for example from a defective memory cell.

Accordingly, a redundancy of stored modified digital words is advantageously provided.

More precisely, according to one embodiment, the storage of said information furthermore comprises, for at least one initial digital word, an operation for writing in the memory plane at n different addresses of n identical modified digital words corresponding to this initial digital word, n being greater than two and where it can be even or odd.

The extraction processing then comprises n extractions carried out on the n modified digital words delivering n positions of the modified bit, and in the case of disagreement between the n positions, a majority choice is made between these n positions.

According to another aspect, a non-volatile memory device is provided that stores in the memory plane words containing data bits and control bits allowing an error correction with an error correction code, together with at least one piece of digital information whose value is defined by at least one position of a modified bit in at least one digital word modified with respect to at least one initial digital word not having any erroneous bit, the modified bit having a modified value with respect to the value of this bit in said at least one initial digital word, the values of the other bits of the modified digital word being identical to those of these same data bits in the initial digital word.

According to one embodiment, the bit of the modified digital word having its value modified is a data bit and the control bits of the modified digital word have values determined based on values of the data bits of said at least one initial digital word.

According to one embodiment, the device stores several digital words respectively modified with respect to several initial digital words not having any erroneous bit, each modified digital word containing a bit having a modified value with respect to the value of this bit in said corresponding initial digital word, the other bits of the modified digital word having values identical to those of these same bits in the corresponding initial digital word, the respective positions of the modified bits in the modified digital words defining together the value of the digital information.

According to another aspect, a system is provided that comprises a memory device such as defined hereinabove, and, in addition, extraction means configured for carrying out an extraction processing on each modified digital word and delivering the position of the modified bit in each modified digital word.

According to one embodiment, the extraction means comprise means forming an error correction code, reading means, processing means configured for determining the value of the digital information, and control means configured for, on the one hand, disabling the means forming an error correction code and enabling the reading means in order to read each modified digital word, and, on the other hand, enabling the means forming an error correction code together with the reading means in order to read each modified digital word, this read operation supplying the values of the bits of each initial digital word, the processing means furthermore comprising comparison means configured for carrying out a comparison of the bits of each modified digital word with the bits of the corresponding initial word, the result of each comparison supplying the position of the modified bit in the corresponding digital word.

According to one variant embodiment, the extraction means, comprise, aside from the reading means, means forming an error correction code and control means configured for enabling the means forming an error correction code and enabling the reading means in order to read each modified digital word, the means forming an error correction code being capable of detecting the position of the modified bit in each modified digital word.

According to one embodiment, the system furthermore comprises writing means and the control means are furthermore configured for enabling the writing means so as to carry out a reprogramming of the memory plane with at least one new digital word replacing at least one modified digital word.

According to one embodiment, the memory device stores, for at least one initial digital word, at n different addresses, n identical modified digital words corresponding to this initial digital word, and the extraction means are configured for carrying out n extractions on the n modified digital words delivering n positions of the modified bit, and in the case of disagreement between the n positions, the processing means are configured for making a majority choice between these n positions so as to determine the position of the modified bit.

In FIG. 1, the reference DIS denotes one example of a memory device according to the invention.

This device DIS comprises a memory MM, for example an EEPROM memory, together with conventional means for writing/reading in this memory MM notably comprising means HV allowing a high programming voltage to be applied, decoder rows and columns DECX and DECY together with a read amplifier AMPL connected to a data register RDD.

The device DIS also comprises means ECC forming an error correction code, with a conventional structure and known per se.

The device DIS also comprises control means MCM comprising for example logic means with a conventional structure capable of enabling the various reading/writing means.

As will be seen in more detail hereinafter, the memory MM is designed to store information which then needs to be extracted. For this purpose, the device DIS comprises extraction means comprising, aside from the reading and control means which have just been described, processing means MTR designed to determine the value of this extracted information.

In the exemplary embodiment described here, the memory device DIS is for example situated within a system SYS, for example an electronic board comprising other integrated circuits.

As will be seen in more detail hereinafter, the value of the information stored in the memory MM will be able to be recovered by the comparison of two digital words (an initial digital word and a modified digital word) for example obtained by two operations for reading the memory MM with the error correction code respectively enabled and disabled. It is for this reason that, in this embodiment, the processing means MTR comprise a comparator CMP connected to the data register RDD of the memory MM, and a processing block BT designed to determine the value of the information INF using the result of the comparison carried out by the comparator CMP.

Figure 2:
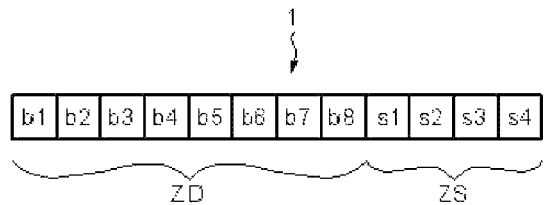

In FIG. 2, the reference 1 denotes the type of digital word designed to be stored in the memory plane of the memory MM. This digital word 1 comprises a field of data bits ZD and a field of control bits ZS.

In the example described here, and for the sake of simplification, it is assumed that each word 1 comprises eight data bits b1-b8 and four control bits s1-s4.

As is conventional and known, means forming an error correction code and referenced ECC, with a conventional structure and known per se, are means allowing, when a word is read in the memory, a syndrome vector to be determined based on the data bits b and on all of the control bits s.

It is recalled here that a syndrome vector is the result of intermediate calculations carried out during the error correction, allowing the error to be detected and localized.

Figure 3:
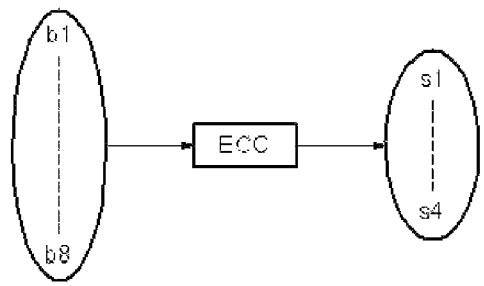

Conversely, the means ECC are also capable of calculating a set of control bits s1-s4 based on a set of data bits b1-b8 (FIG. 3).

Figure 4:
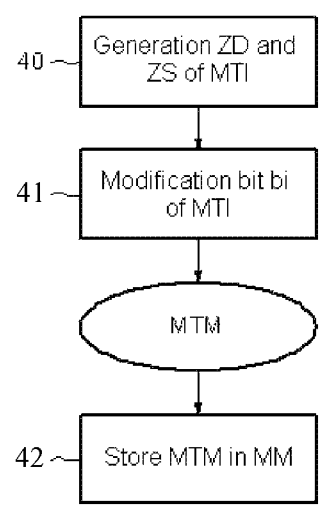

One example of the storage of information in the memory MM will now be described with more particular reference to FIGS. 4 and 5.

First of all, the data field ZD and the control field ZS of an initial digital word MTI are generated (step 40).

Then, one of the data bits bi of the initial digital word MTI is modified (step 41).

A modified digital word MTM is therefore obtained which is stored (step 42) in the memory MM. As will be seen hereinafter, the position of the modified bit in the word MTM defines the value of the digital information. Of course the writing means are furthermore configured for writing such a word whose control bits do not correspond to the data bits.

Figure 5:
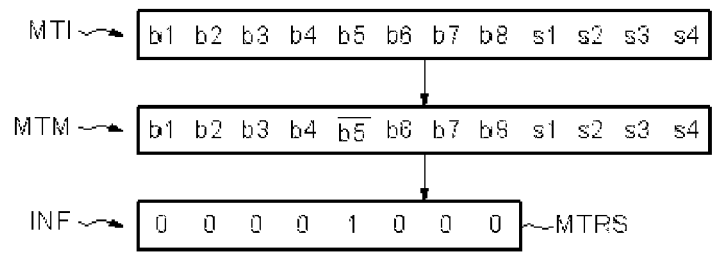

One practical example is illustrated in FIG. 5.

In this example, it is assumed that the data bit b5 of the initial word MTI has been modified by the value $\overline{b5}$, so as to define the modified digital word MTM.

Of course, the control bits s1-s4 have been determined based on values of the data bits b1-b8 in the initial digital word MTI.

It can therefore be seen that the digital information INF may be defined by a digital word MTRS with eight bits, for example all having the logical value "0", except for the fifth bit of this word MTRS which has the logical value "1".

In this example, it is accordingly possible to define eight different logical values for the information INF since it is possible to change one data bit amongst eight.

As a variant, the position of the modified bit can be coded over 3 bits (8 possible positions in the data bits). The information INF is then a digital word with 3 bits having 8 possible values.

It will be noted that the information INF is "transparent" with respect to the initial content of the memory MM for a user reading the memory in a conventional manner.

Indeed, since none of the bits (data bits and control bits) of the initial word MTI is erroneous, and the modified word MTM only comprises a single erroneous bit, when the word MTM is read, the means ECC will detect and correct the erroneous bit b5 so as to deliver the initial word MTI at the output.

On the other hand, extraction processing is provided that is carried out on the modified digital word MTM and which delivers the position of the modified bit in this modified digital word.

Figure 6:
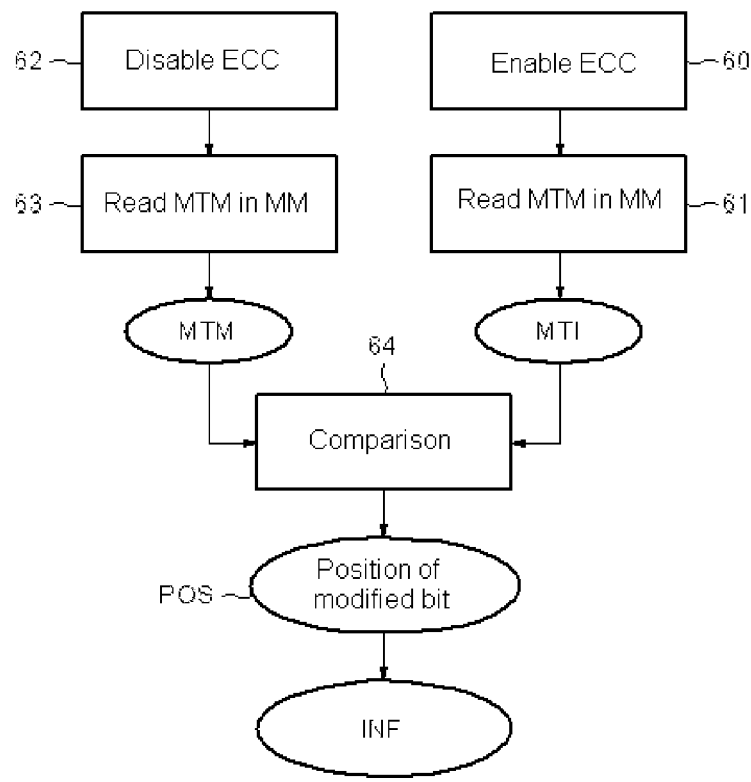

One example of extraction processing is illustrated in FIG. 6.

In this example, the control means MCM are configured for enabling the error correction code ECC (step 60), and, as explained hereinabove, the reading of the word MTM in the memory MM (step 61) allows the initial word MTI to be recovered. Then, the control means MCM disable (step 62) the means ECC forming an error correction code so as to read the modified digital word MTM in the memory MM (step 63).

The means for comparison CMP of the extraction means MTR then perform a comparison bit by bit (step 64) between the data bits of the word MTI and the data bits of the word MTM. The processing block BT then determines the position POS of the modified bit, which allows the value of the information INF to be determined.

It goes without saying that the order in which the two read operations are carried out is irrelevant.

In one particularly simple case where the initial word MTI only contains "1"s for example, the bit by bit comparison is not necessary, and it simply suffices to determine the rank of the "0" in the modified digital word.

Of course, if the modified bit in the word MTM is situated in the control bits s1-s4, the same procedure as that just described for the data bits may be carried out, in other words disabling of the means ECC and a bit by bit comparison of the word MTM and of the word MTI, with however the addition of a dedicated circuitry allowing the corrected value of the control bits to be output.

Not only, as explained hereinabove, is the information INF "buried" in the content of the memory MM, in the sense that the storage is "transparent" during a conventional operation for reading the memory, but this storage is also ephemeral because the information INF disappears during a reprogramming of the memory plane with a new digital word replacing the modified digital word.

Figure 7:
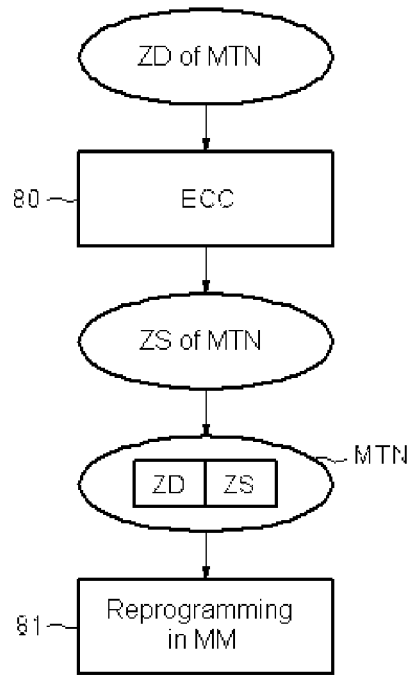

This is explained in more detail in FIG. 7.

It is assumed, after reading the word MTM, that it is desired to reprogram the memory MM with a new digital word MTN having a different field ZD of data bits.

The means ECC then determine (step 80) the field ZS of the control bits of the word MTN.

The word MTN is then re-written into the memory MM (step 81) in place of the word MTM.

It is then impossible to recover the information INF.

Figure 8:
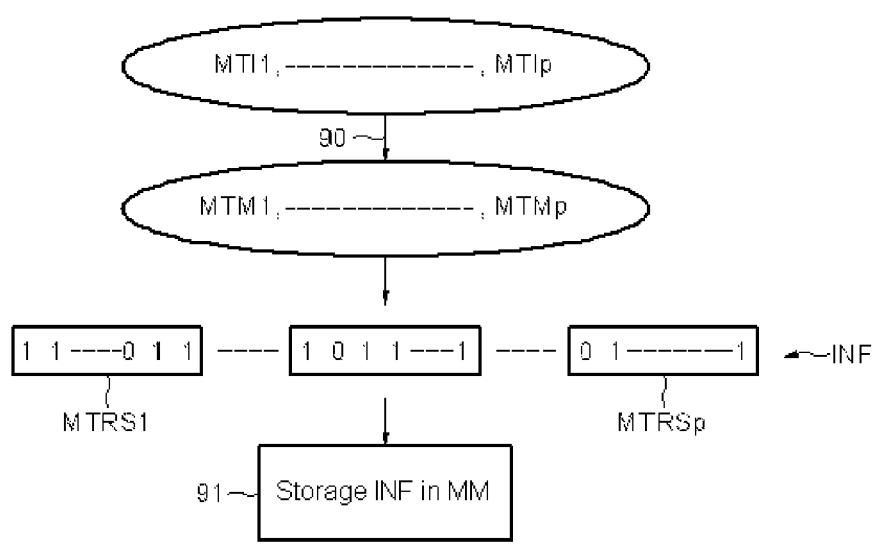

It goes without saying that everything that has just been described may be generalized to several initial words MTI1-MTIp (FIG. 8).

For this purpose, each initial word MTIi is modified (step 90) into a modified digital word MTMi.

Thus, each modified digital word MTMi contains a bit having a modified value with respect to the value of this bit in the corresponding initial digital word MTIi, the other bits of the modified digital word having values identical to those of these same bits in the corresponding initial digital word.

The respective positions of the modified bits in the modified digital words then define together the value of the digital information INF.

In practice, the information INF can, as illustrated in FIG. 8, be represented by p digital words MTRSi, the logical value "0" in each of the words MTRSi defining a position of modified bits. It can therefore be seen here that the number of possible logical values of information INF depends on the number of bits in the words MTRSi and on the number p.

As a variant, as explained hereinabove, the information INF can be a digital word of reduced size whose logical value represents the values of the ranks of the modified bits in the modified digital words.

As far as the extraction of the information INF is concerned, what has previously been described for a modified digital word is applicable here for each of the modified digital words MTMi.

It is not impossible, in some cases, that certain locations or memory cells of the memory plane are defective. This can then lead to modified digital words MTM containing two erroneous bits.

It is for this reason that a redundant storage is advantageously provided for at least some of the modified digital words MTM in the memory MM.

Figure 9:
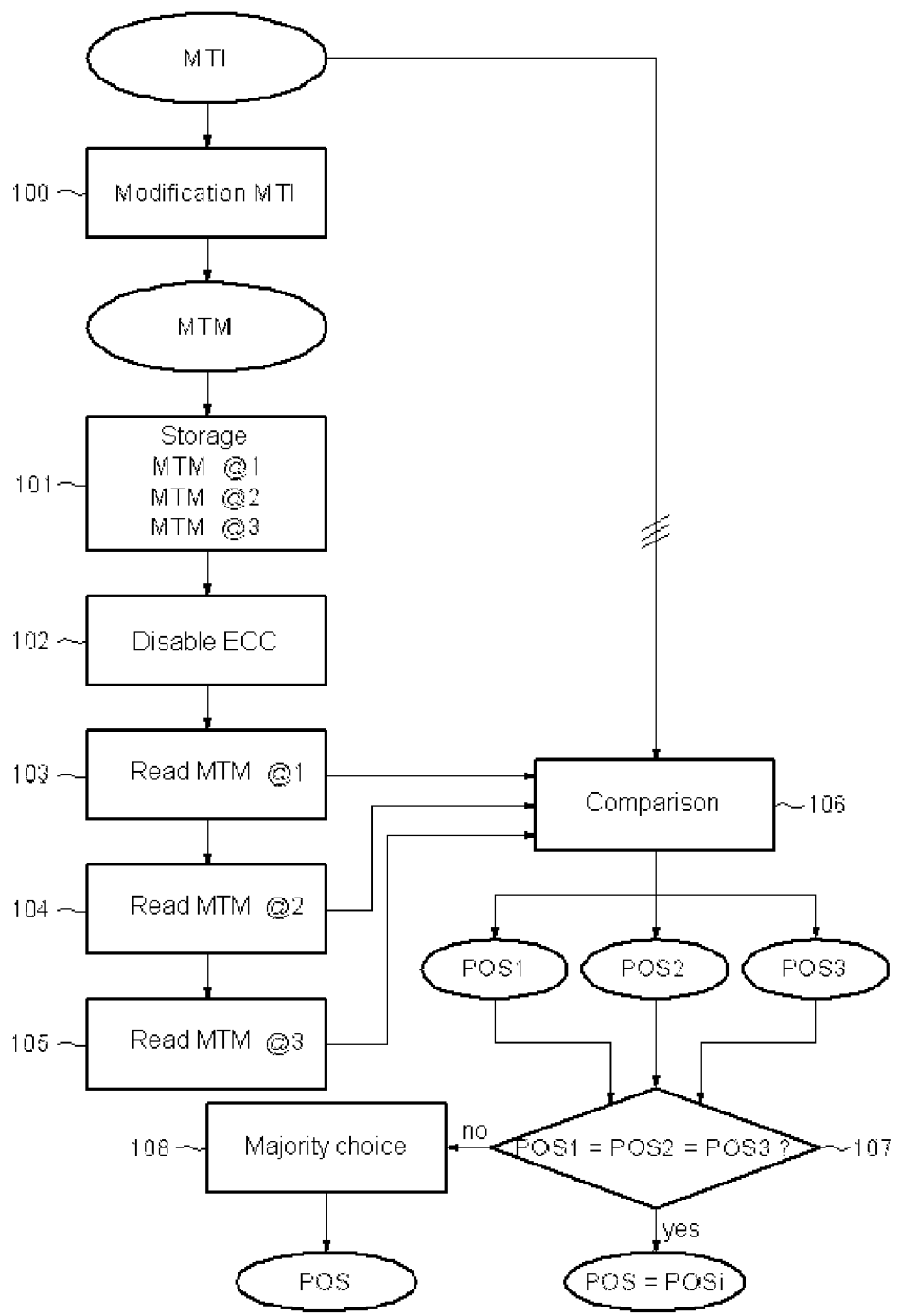

This is illustrated, in one particular example, in FIG. 9.

Generally speaking, in order to apply such a redundancy, for at least one initial digital word, n identical modified digital words corresponding to this initial digital word may be written at n different addresses.

In practice, it is statistically very unlikely that the n memory locations designed to receive the n modified words all comprise a defective memory cell (which would be equivalent to having 2 errors in each of the n modified words). Accordingly, statistically the majority of these n memory locations will not contain any defective memory cell. Although the value 3 for n is an acceptable value, the greater the number n, the more this statistic will be exact.

In the example illustrated in FIG. 9, it is assumed that n is equal to 3.

Thus, starting from an initial digital word MTI, a modification (step 100) of this word MTI is carried out so as to obtain a modified digital word MTM.

This word MTM is then stored (step 101) at three different addresses, namely the addresses @1, @2 and @3.

In order to extract the digital information INF, the means ECC are disabled (step 102) and an operation for reading the word MTM at the address@1 (step 103), an operation for reading the word MTM at the address@2 (step 104) and an operation for reading the word MTM at the address@3 (step 105) are carried out.

Subsequently, three comparisons are carried out (step 106) of each extracted word MTM bit by bit with the corresponding initial digital word MTI, that has for example been obtained by reading the modified word MTM with the ECC code enabled, so as to obtain three positions POS1, POS2, POS3 for the modified bit.

In the case where the three positions POS1, POS2, POS3 are identical (step 107), the effective position of the modified bit in the word MTM is indeed one of the positions POSi.

In the case where there is no equality between the various positions POSi, the processing block BT for the extraction means MTR makes a majority choice (step 108) so as to obtain the position POS.

Thus, for example, if two of the positions are identical and different from the third position, it is the value of these two identical positions that will be taken into account for the value POS.

As a variant, it would be possible to make the majority choice on the content of the n modified words so as to only keep one modified word MTM and to subsequently compare this word MTM with the corresponding word MTI obtained by reading the word MTM with the ECC code enabled, so as to obtain the position of the error.

Although, in the example hereinabove, n has been chosen to be odd, it is perfectly possible to choose n as even, for example equal to 4. Indeed, an even value does not prohibit the majority vote, because in the case of multiple errors there are not only two candidates, namely a single exact value and a single erroneous value but a single exact value and very probably different erroneous values.

In the examples just described, the extraction of the information INF buried in the content of the memory plane MM was achieved by disabling and enabling means ECC.

Figure 10:
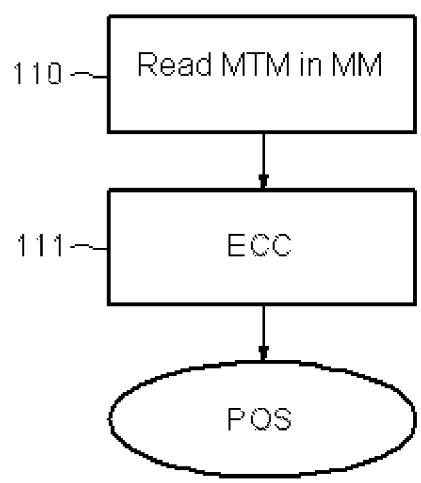

As a variant, as illustrated in FIG. 10, the control means can be configured for enabling the means ECC forming an error correction code and enabling the reading means for reading (step 110) each modified digital word MTM. The means ECC are then capable of detecting (step 111) the position of the modified bit in each modified digital word.

Although the invention has been described hereinabove by way of example with words of eight data bits and of four control bits, the invention may also be applied with words of 32 data bits and of 6 control bits. Thus, if the modified bit must be situated in the data bits of a word, reading the data bits in the variant where the means ECC are disabled makes a modified bit appear whose rank (from 0 to 31) corresponds to logical information INF represented by a word with five bits.

In the case of an EEPROM memory with 64 Kbits, comprising 2048 words of (32+6) bits, 10240 bits may therefore be buried in the memory since an error may be injected (32 possible positions) into each of the 2048 words.

By way of example, the memory is delivered initialized as fields of FF with the logical information INF "buried" in these fields.

The user of the memory extracts and uses the logical information INF, for example by storing this logical information INF in a protected additional memory.

The user can subsequently write his own user data into the memory plane and, consequently, all or part of the logical information INF is definitively erased.

The invention may advantageously be applied to the monitoring of the non-replacement of an odometer on a vehicle.

Upon first installation of the unit containing the odometer, the memory is delivered for example with information INF "buried" in an initial content (fields FF for example).

The user extracts the logical information INF as explained hereinabove and stores it in a protected additional memory which can be situated on the same board as that carrying the odometer, or else in another integrated circuit on another board.

The user subsequently stores his own user data and thus erases the information INF.

If, at a later stage, a malicious third party wishes to replace the existing odometer by another odometer showing a lower kilometric value, any logical information inserted by the malicious third party into the new odometer will certainly not coincide with that initially contained in the protected additional memory. An alert can then be generated.

The invention claimed is:

1. A method for processing a non-volatile memory designed to store words containing data bits and control bits allowing error correction with an error correction code, the method comprising:
storing information in a memory plane including writing in the memory plane at least one modified digital word modified with respect to at least one initial digital word not having any erroneous bit, said at least one modified digital word containing a bit at a position and having a modified value with respect to the value of a corresponding bit in the at least one initial digital word, other bits of the at least one modified digital word having values identical to corresponding bits in the initial digital word, the position of the modified bit in said at least one modified digital word defining a value of digital information.

2. The method according to claim 1, in which the bit of the at least one modified digital word having the modified value is a data bit and control bits of the at least one modified digital word have values determined based on the values of the data bits of said at least one initial digital word.

3. The method according to claim 1, in which storing information in the memory plane comprises writing in the memory plane a plurality of modified digital words respectively modified with respect to a plurality of initial digital words not having any erroneous bit, each modified digital word containing a bit having a modified value with respect to the value of a corresponding bit in the corresponding initial digital word, other bits of the modified digital word having values identical to those of corresponding bits in the corresponding initial digital word, the respective positions of the modified bits in the modified digital words defining together a value of digital information.

4. The method according to claim 1, further comprising an extraction process carried out on the at least one modified digital word and determining the position of the modified bit in the at least one modified digital word.

5. The method according to claim 4, in which the extraction process comprises disabling an error correction code and reading the modified digital word.

6. The method according to claim 5, further comprising comparing the bits of each at least one modified digital word with the bits of the corresponding initial word, the result of each comparison supplying the position of the modified bit in the corresponding digital word.

7. The method according to claim 5, furthermore comprising enabling the error correction code and reading each modified digital word, this read operation supplying the values of the bits of each initial digital word.

8. The method according to claim 4, in which the extraction process comprises a detection, by the error correction code, of the position of the modified bit in each modified digital word.

9. The method according to claim 4, further comprising reprogramming the memory plane with at least one new digital word replacing at least one modified digital word.

10. The method according to claim 4, in which storing information further comprises, for at least one initial digital word, an operation for writing in the memory plane at n different addresses n identical modified digital words corresponding to this at least one initial digital word, and wherein said extraction process comprises n extractions carried out on the n modified digital words determining n positions of the modified bit, and in case of a disagreement between the n positions, a majority choice between these n positions.

11. A non-volatile memory system configured to store in a memory plane words containing data bits and control bits allowing an error correction with an error correction code, together with at least one piece of digital information whose value is defined by at least one position of a modified bit in at least one digital word modified with respect to at least one initial digital word not having any erroneous bit, the modified bit having a modified value with respect to the value of this bit in said at least one initial digital word, the values of the other bits of the modified digital word being identical to those of these same data bits in the initial digital word.

12. The system according to claim 11, in which the bit of the modified digital word having its value modified is a data bit and the control bits of the modified digital word have values determined based on values of the data bits of said at least one initial digital word.

13. The system according to claim 11, wherein the non-volatile memory system is configured to store a plurality of digital words respectively modified with respect to a respective plurality of initial digital words not having any erroneous bit, each modified digital word containing a bit having a modified value with respect to the value of this bit in a corresponding initial digital word, the other bits of the modified digital word having values identical to those of these same bits in the corresponding initial digital word, the respective positions of the modified bits in the modified digital words defining together the value of the digital information.

14. The system according to claim 11, in which the non-volatile memory system is of an electrically programmable and erasable type.

15. The system according to claim 11, further comprising extraction means configured to carrying out an extraction process on each modified digital word and for determining the position of the modified bit in each modified digital word.

16. The system according to claim 15, in which the extraction means comprise means forming an error correction code, reading means, processing means configured for determining said value of the digital information, and control means configured for disabling the means forming an error correction code and enabling the reading means for reading each modified digital word, the processing means comprising comparison means configured for carrying out a comparison of the bits of each modified digital word with the bits of each corresponding initial word, the result of each comparison supplying the position of the modified bit in the corresponding digital word.

17. The system according to claim 16, in which the control means are further configured for enabling the means forming an error correction code and enabling the reading means for reading each modified digital word, this read operation supplying the values of the bits of each initial digital word.

18. The system according to claim 15, in which the extraction means comprise reading means, means forming an error correction code and control means configured for enabling the means forming an error correction code and enabling the reading means for reading each modified digital word, the means forming an error correction code being capable of detecting the position of the modified bit in each modified digital word.

19. The system according to claim 18, further comprising writing means and the control means are further configured for enabling the writing means so as to carry out a reprogramming of the memory plane with at least one new digital word replacing at least one modified digital word.

20. The system according to claim 15, in which the non-volatile memory system stores, for at least one initial digital word, at n different addresses, n identical modified digital words corresponding to this initial digital word, and the extraction means are configured for carrying out n extractions on the n modified digital words determining n positions of the modified bit, and in case of disagreement between the n positions, the extraction means are configured for making a majority choice between these n positions so as to determine the position of the modified bit.

21. A method comprising:
receiving data bits;
generating control bits from the data bits to form an initial digital word, the initial digital word including the data bits and the control bits;
after generating the control bits, modifying a bit of the initial digital word to obtain a modified digital word, wherein digital information is embedded in the modified digital word based upon the location of the modified bit relative to other bits of the modified digital word; and
storing the modified digital word in a memory.

22. The method of claim 21 further comprising:
reading the modified digital word from the memory using an error correction process to obtain a recovered initial digital word;
reading the modified digital word from the memory with the error correction process disabled to obtain a recovered modified digital word; and
comparing the recovered initial digital word and the recovered modified digital word.

23. The method of claim 21 wherein the control bits are error correction code bits.

24. The method of claim 21 wherein modifying a bit of the initial digital word to obtain a modified digital word comprises modifying a data bit.

25. The method of claim 21 further comprising storing the modified digital word in n locations in the memory.

26. The method of claim 21 wherein the memory is a non-volatile memory.

27. The method of claim 22 wherein comparing the recovered initial digital word and the recovered modified digital word comprises determining the location of the modified bit relative to other bits of the modified digital word.

28. The method of claim 22 wherein the modified digital word is stored in n memory locations in the memory and wherein steps of reading the modified digital word from the memory with the error correction process disabled to obtain a recovered modified digital word, and comparing the recovered initial digital word and the recovered modified digital word are carried out n times.

29. The method of claim 28 wherein n results of the n comparing steps are correlated and a majority choice is made of the n results.

30. A system comprising:
error correction code circuitry associated with a memory plane, the error correction circuitry configured to generate an initial digital word including data bits and control bits;
a modification circuit configured to modify one bit of the initial digital word to generate a modified digital word;
the memory plane configured to store the modified digital word;
a circuit configured to enable and disable the error correction code circuitry; and
a comparison circuit configured to receive from the memory plane a recovered modified digital word, the recovered modified digital word being the modified digital word read from the memory plane with the error correction code circuitry disabled, and to receive from the memory plane a recovered initial digital word, the recovered initial digital word being the modified digital word read from the memory plane with the error correction code circuitry enabled, and for comparing the recovered modified digital word and the recovered initial digital word, and to determine from the comparison a location of the modified bit, relative the other bits.

31. The system of claim 30 wherein the memory plane comprises electrically erasable programmable memory.

32. The system of claim 30 wherein the modification circuit is configured to modify a data bit of the initial digital word.

* * * * *